(12) United States Patent
Fukami

(10) Patent No.: US 8,118,004 B2
(45) Date of Patent: Feb. 21, 2012

(54) ROCKER ARM, ROCKER SHAFT, VALVE CAP, ADJUST SCREW, PIVOT RECEIVING MEMBER, AND VALVE OF ARM TYPE VALVE OPERATING DEVICE

(75) Inventor: Rino Fukami, Iwata (JP)

(73) Assignee: NTN Corporation, Osaka (JP)

( * ) Notice: Subject to any disclaimer, the term of this patent is extended or adjusted under 35 U.S.C. 154(b) by 307 days.

(21) Appl. No.: 12/085,654

(22) PCT Filed: Dec. 26, 2006

(86) PCT No.: PCT/JP2006/325834
§ 371 (c)(1), (2), (4) Date: May 29, 2008

(87) PCT Pub. No.: WO2007/077804
PCT Pub. Date: Jul. 12, 2007

(65) Prior Publication Data
US 2009/0266324 A1 Oct. 29, 2009

(30) Foreign Application Priority Data

Dec. 27, 2005 (JP) .................................. 2005-376170
Dec. 28, 2005 (JP) .................................. 2005-377632
Dec. 28, 2005 (JP) .................................. 2005-377645
Dec. 28, 2005 (JP) .................................. 2005-378610

(51) Int. Cl.
*F01L 1/18* (2006.01)
(52) U.S. Cl. .................................. 123/90.39; 123/90.48
(58) Field of Classification Search ............... 123/90.16, 123/90.39, 90.48, 90.52
See application file for complete search history.

(56) References Cited

U.S. PATENT DOCUMENTS

| | | | |
|---|---|---|---|
| 4,836,162 A * | 6/1989 | Melde-Tuczai et al. ...... 123/321 |
| 4,893,387 A | 1/1990 | Akamatsu et al. |
| 5,064,298 A | 11/1991 | Hibi et al. |
| 5,129,860 A | 7/1992 | Asahara et al. |
| 5,159,852 A | 11/1992 | Harimoto |
| 5,397,188 A | 3/1995 | Yoshizuka et al. |
| 5,456,136 A * | 10/1995 | Yamashita et al. .............. 74/569 |

(Continued)

FOREIGN PATENT DOCUMENTS

DE    44 18 245    2/1995

(Continued)

OTHER PUBLICATIONS

International Search Report mailed Apr. 10, 2007 for International Application No. PCT/JP2006/325834.

(Continued)

*Primary Examiner* — Zelalem Eshete
(74) *Attorney, Agent, or Firm* — Wenderoth, Lind & Ponack, L.L.P.

(57) ABSTRACT

Provided are a rocker arm, a rocker shaft, a valve cap, an adjust screw, a pivot receiving member, and a valve of an arm type valve operating device that can suppress wear and pitching, and attain a long service life. A multiplicity of minute recesses are provided at random in contact portions with other members of those members. A surface provided with recesses has a surface roughness parameter Ryni that is in a range: 0.4 μm≦Ryni≦1.0 μm, and an Sk value of −1.6 or less. Accordingly, contact surfaces exhibit a high oil-film-forming capacity, so a long service life is attained even under a condition of low viscosity, thin lubrication and extremely thin oil film.

21 Claims, 7 Drawing Sheets

U.S. PATENT DOCUMENTS

| | | | |
|---|---|---|---|
| 2004/0231622 A1* | 11/2004 | Takamura | 123/90.6 |
| 2007/0258672 A1 | 11/2007 | Tsujimoto et al. | |
| 2007/0286543 A1 | 12/2007 | Tsujimoto et al. | |
| 2009/0016664 A1 | 1/2009 | Tsujimoto | |

FOREIGN PATENT DOCUMENTS

| | | |
|---|---|---|
| EP | 1 770 290 | 4/2007 |
| EP | 1 770 293 | 4/2007 |
| EP | 1 770 294 | 4/2007 |
| GB | 2 219 359 | 12/1989 |
| GB | 2 238 584 | 6/1991 |
| GB | 2 253 255 | 9/1992 |
| JP | 02-130205 | 5/1990 |
| JP | 02-195029 | 8/1990 |
| JP | 03-117724 | 5/1991 |
| JP | 03-117725 | 5/1991 |
| JP | 3-172608 | 7/1991 |
| JP | 04-321816 | 11/1992 |
| JP | 4-350310 | 12/1992 |
| JP | 06-042536 | 2/1994 |
| JP | 07-077015 | 3/1995 |
| JP | 07-150921 | 6/1995 |
| JP | 08-035408 | 2/1996 |
| JP | 08-233070 | 9/1996 |
| JP | 2000-205284 | 7/2000 |
| JP | 2001-152817 | 6/2001 |
| JP | 2001-263031 | 9/2001 |
| JP | 2002-097906 | 4/2002 |
| JP | 2004-125049 | 4/2004 |
| JP | 2005-264736 | 9/2005 |

OTHER PUBLICATIONS

Supplementary European Search Report dated Sep. 10, 2009 in corresponding European Application No. 06843218.6.

* cited by examiner

ROCKER ARM, ROCKER SHAFT, VALVE CAP, ADJUST SCREW, PIVOT RECEIVING MEMBER, AND VALVE OF ARM TYPE VALVE OPERATING DEVICE

TECHNICAL FIELD

The present invention relates to a rocker arm, a rocker shaft, a valve cap, an adjust screw, a pivot receiving member, and a valve of an arm type valve operating device.

BACKGROUND ART

An arm type valve operating device using a rocker arm opening and closing an intake valve or an exhaust valve through rotation of a cam is of two types: an end pivot type in which a cam shaft is arranged above a swingably-supported rocker arm, and a center pivot type in which a cam shaft is arranged below a rocker arm.

In the end pivot type, the rocker arm is pushed down by a cam provided on the cam shaft to open the valve; and, in the center pivot type, one end portion of the rocker arm is pushed up by a cam provided on the cam shaft to open the valve with the other end portion of the rocker arm.

That is, in the center pivot type, the rocker arm is pivoted to the rocker shaft, and is swingable around the rocker shaft axis. Thus, the rocker arm and the rocker shaft are in sliding contact with each other. Thus, it is desirable that the contact surfaces be not worn.

In a related-art technology, to achieve an improvement in terms of durability, lubricant oil is supplied to the sliding portions between the rocker arm and the rocker shaft (Patent Document 1).

In the case of the end pivot type, a valve cap coming into contact with the rocker arm may be arranged at the forward end of the valve stem portion of the valve. It is necessary for such a valve cap to be superior in durability. Thus, in a related-art technology, an attempt is made to achieve an improvement in durability (Patent Document 2).

In the valve cap disclosed in Patent Document 2, the abutment portion of the valve cap in press contact with the rocker arm is shifted circumferentially little by little each time the rocker arm comes into press contact therewith; further, there is used a high speed tool steel material.

An adjust screw is disposed adjacent to the rocker arm; in the center pivot type, the adjust screw is held in sliding contact with a valve; in the end pivot type, it is held in sliding contact with a pivot receiving member. Thus, it is desirable for the contact surfaces not to be worn.

In a related-art technology, in order to achieve an improvement in durability, a lubricant member is provided in an engagement portion between a screw and a socket receiving the same (Patent Document 3).

According to the disclosure of Patent Document 3, engine oil, for example, is used for the lubricant member, and the engagement portion of the screw and the socket is filled with oil. Patent Document 3 further discloses use of alloy steel that has undergone surface-hardening treatment for one of the screw and the socket.

In the case of the end pivot type, the valve receiving portion of the rocker arm and the valve are in sliding contact with each other, so the valve receiving portion must be superior in durability. In view of this, in a related-art technology, an attempt is made to achieve an improvement in durability (Patent Document 4).

In the rocker arm disclosed in Patent Document 4, a diamond-like carbon film is formed on the portion thereof coming into contact with the valve. The surface roughness Ry (maximum height in μm) of the diamond-like carbon film is 3.2 or less, and the thickness of the diamond-like carbon film ranges from 1.0 to 5.0 μm, with the adhesion property being 40 N or more.

Patent Document 1: JP 07-150921 A
Patent Document 2: JP 2001-152817 A
Patent Document 3: JP 08-35408 A
Patent Document 4: JP 2002-97906 A

SUMMARY OF THE INVENTION

Problems to be Solved by the Invention

However, in the technology as disclosed in Patent Document 1, the rocker arm preferentially supplies lubricant oil to the sliding portion between itself and the rocker shaft, so it is necessary to provide an oil escape passage and a valve device arranged in the oil escape passage, resulting in a rather complicated construction. Further, when there is a shortage of lubricant oil, wear and pitching occur in the contact portions.

Further, the valve cap comes into contact with the rocker arm instead of the forward end of the valve stem portion, so wear and pitching are likely to occur due to sliding contact; thus, even when, as in Patent Document 2, the abutment portion of the valve cap is shifted little by little each time press contact is effected, or a high speed tool steel material or the like is used, lubricant oil is not supplied in a sufficient amount, so in some cases it is impossible to sufficiently suppress wear and pitching.

In the technology in which, as in Patent Document 3, filling with the lubricant member is effected, it is necessary to adopt a structure which does not allow the lubricant member to flow out; further, at the time of assembly, it is necessary to perform the operation of filling with the lubricant member. Thus, a rather high cost is involved, and, when the lubricant member is depleted, wear occurs in the engagement portion (contact surfaces) between the screw and the socket. Further, even when an alloy steel that has undergone surface effect treatment is used, there are cases in which it is impossible to sufficiently suppress wear and pitching of the contact surfaces.

Further, due to the sliding contact, the valve receiving portion is subject to wear and pitching, and a sufficient amount of lubricant oil is not supplied even when a diamond-like carbon film is formed as described in Patent Document 4, so there are cases in which wear and pitching cannot be sufficiently suppressed.

It is an object of the present invention to provide a rocker arm, a rocker shaft, a valve cap, an adjust screw, a pivot receiving member, and a valve which can help to suppress wear and pitching and to attain an increase in service life.

Means for Solving the Problems

In order to solve the above-mentioned problems, the rocker arm of the present invention is characterized by including a rocker arm for opening and closing a valve, including: a multiplicity of minute recesses provided at random at least in a contact portion coming into contact with a rocker shaft; and a surface with the recesses having a surface roughness parameter Ryni that is in a range: $0.4\ \mu m \leqq Ryni \leqq 1.0\ \mu m$, and an Sk value of $-1.6$ or less.

Further, the rocker shaft of the present invention is characterized by including a rocker shaft which supports a rocker arm for opening and closing a valve, including: the multiplicity of minute recesses provided at random at least in a contact portion coming into contact with the rocker arm; and a surface with the recesses having a surface roughness parameter Ryni that is in a range: $0.4\,\mu m \leq Ryni \leq 1.0\,\mu m$, and an Sk value of $-1.6$ or less.

Further, the valve cap of the present invention is characterized by including a valve cap arranged at a forward end of a valve and abutting a rocker arm, including: the multiplicity of minute recesses provided at random at least in one of a contact portion coming into contact with the valve and a contact portion coming into contact with the rocker arm; and a surface with the recesses having a surface roughness parameter Ryni that is in a range: $0.4\,\mu m \leq Ryni \leq 1.0\,\mu m$, and an Sk value of $-1.6$ or less.

Further, the adjust screw of the present invention is characterized by including an adjust screw attached to a rocker arm for opening and closing a valve, including the multiplicity of minute recesses provided at random at least in a contact surface coming into contact with another member, in which the surface with the recesses has a surface roughness parameter Ryni that is in a range: $0.4\,\mu m \leq Ryni \leq 1.0\,\mu m$, and an Sk value of $-1.6$ or less. The term "another member" herein refers to the valve or the pivot receiving member.

Further, the pivot receiving member of the present invention is characterized by including a pivot receiving member receiving an adjust screw attached to a rocker arm for opening and closing a valve, including the multiplicity of minute recesses provided at random in a contact surface coming into contact with the adjust screw, in which the surface with the recesses has a surface roughness parameter Ryni that is in a range: $0.4\,\mu m \leq Ryni \leq 1.0\,\mu m$, and an Sk value of $-1.6$ or less.

Further, the rocker arm of an arm type valve operating device of the present invention is characterized by including a rocker arm of an arm type valve operating device receiving a forward end portion of a valve by a valve receiving portion, including the multiplicity of minute recesses provided at random at least in a receiving surface of the valve receiving portion, in which the surface with the recesses has a surface roughness parameter Ryni that is in a range: $0.4\,\mu m \leq Ryni \leq 1.0\,\mu m$, and an Sk value of $-1.6$ or less.

Further, the valve of an arm type valve operating device of the present invention is characterized by including a valve of an arm type valve operating device whose forward end portion comes into contact with a rocker arm, including the multiplicity of minute recesses provided at random at least in an arm contact surface of the forward end portion, in which the surface provided with the recesses has a surface roughness parameter Ryni that is in a range: $0.4\,\mu m \leq Ryni \leq 1.0\,\mu m$, and an Sk value of $-1.6$ or less.

The parameter Ryni refers to an average value of reference length maximum height, that is, a value obtained by extracting a reference length of the roughness curve in the average line direction and measuring the distance between the crest line and the trough line of this extracted portion in the direction of longitudinal magnification of the roughness curve (ISO 4287: 1997).

The parameter Sk refers to the degree of distortion (skewness) of the roughness curve (ISO 4287: 1997); it is a statistic amount indicating asymmetric diversity in protrusion/recess distribution. In a symmetrical distribution like Gaussian distribution, the Sk value is close to zero; when the protrusions are removed from the protrusions and recesses, it assumes a negative value, and, in the reverse case, it assumes a positive value.

As described above, in the present invention, the surface roughness parameter Ryni of the surface with recesses (contact portion) is set within the range: $0.4\,\mu m \leq Ryni \leq 1.0\,\mu m$, whereby it is possible to prevent depletion of oil film even under a condition of thin lubrication, thereby enabling to attain a long service life even when the oil film thickness is extremely small. Further, by setting the Sk value of the contact surface to $-1.6$ or less in both the width direction and the circumferential direction, the minute recesses constitute oil sumps, and, even when compressed, little oil leakage is involved in the slipping direction and the right-angle direction, thereby attaining superior oil film formation property and minimizing surface damage.

Further, in order to solve the above-mentioned problems, the rocker arm of the present invention is characterized by including a rocker arm for opening and closing a valve, including the multiplicity of minute recesses provided at random at least in a contact portion coming into contact with the rocker shaft, in which an average area of the recesses of the surface provided with the recesses ranges from 30 to $100\,\mu m^2$, and in which the surface provided with the recesses has a surface roughness parameter Rymax ranging from 0.4 to 1.0 $\mu m$.

Further, the rocker shaft of the present invention is characterized by including a rocker shaft which supports a rocker arm for opening and closing a valve, including the multiplicity of minute recesses provided at random at least in a contact portion coming into contact with the rocker arm, in which an average area of the recesses of the surface provided with the recesses ranges from 30 to $100\,\mu m^2$, and in which the surface provided with the recesses has a surface roughness parameter Rymax ranging from 0.4 to 1.0 $\mu m$.

Further, the valve cap of the present invention is characterized by including a valve cap arranged at a forward end of a valve and abutting a rocker arm, including the multiplicity of minute recesses provided at random at least in one of a contact portion coming into contact with the valve and a contact portion coming into contact with the rocker arm, in which an average area of the recesses ranges from 30 to $100\,\mu m^2$, and in which Rymax ranges from 0.4 to 1.0 $\mu m$.

Further, the adjust screw of the present invention is characterized by including an adjust screw attached to a rocker arm for opening and closing a valve, including the multiplicity of minute recesses provided at random at least in a contact surface coming into contact with another member, in which an average area of the recesses of the surface provided with the recesses ranges from 30 to 1000 $m^2$, and in which the surface provided with the recesses has a surface roughness parameter Rymax ranging from 0.4 to 1.0 $\mu m$. The term "another member" herein also refers to the valve or the pivot receiving member.

Further, the pivot receiving member of the present invention is characterized by including a pivot receiving member receiving an adjust screw attached to a rocker arm for opening and closing a valve, including the multiplicity of minute recesses provided at random in a contact surface coming into contact with the adjust screw, in which an average area of the recesses of the surface provided with the recesses ranges from 30 to $100\,\mu m^2$, and in which the surface provided with the recesses has a surface roughness parameter Rymax ranging from 0.4 to 1.0 $\mu m$.

Further, the rocker arm of an arm type valve operating device of the present invention is characterized by including a rocker arm of an arm type valve operating device receiving a forward end portion of a valve by a valve receiving portion, including the multiplicity of minute recesses provided at random at least in a receiving surface of the valve receiving portion, in which an average area of the recesses ranges from 30 to $100\,\mu m^2$, and in which Rymax ranges from 0.4 to 1.0 $\mu m$.

Further, the valve of an arm type valve operating device of the present invention is characterized by including a valve of an arm type valve operating device whose forward end portion comes into contact with a rocker arm, including the multiplicity of minute recesses provided at random at least in an arm contact surface of the forward end portion, in which an average area of the recesses ranges from 30 to 100 µm², and in which Rymax ranges from 0.4 to 1.0 µm.

As described above, in the present invention, the average area of the recesses of the contact surface (contact portion) is set within the range of 30 to 100 µm², and the surface roughness parameter Rymax of the surface with recesses is set within the range of 0.4 to 1.0 µm, whereby it is possible to achieve an improvement in terms of oil-film-forming capacity, so a long service life can be attained even under a condition of thin lubrication and an extremely thin oil film.

In order to solve the above-mentioned problems, the rocker arm of the present invention is characterized by including a rocker arm for opening and closing a valve, including the multiplicity of minute recesses provided at random at least in a contact portion coming into contact with the rocker shaft, in which a recess area ratio of the surface provided with the recesses ranges from 5 to 20%, and in which the surface provided with the recesses has a surface roughness parameter Rymax ranging from 0.4 to 1.0 µm.

Further, the rocker shaft of the present invention is characterized by including a rocker shaft which supports a rocker arm for opening and closing a valve, including the multiplicity of minute recesses provided at random at least in a contact portion coming into contact with the rocker arm, in which a recess area ratio of the surface provided with the recesses ranges from 5 to 20%, and in which the surface provided with the recesses has a surface roughness parameter Rymax ranging from 0.4 to 1.0 µm.

Further, the valve cap of the present invention is characterized by including a valve cap arranged at a forward end of a valve and abutting a rocker arm, including the multiplicity of minute recesses provided at random at least in one of a contact portion coming into contact with the valve and a contact portion coming into contact with the rocker arm, in which a recess area ratio of the surface provided with the recesses ranges from 5 to 20%, and in which the surface provided with the recesses has a surface roughness parameter Rymax ranging from 0.4 to 1.0 µm.

Further, the adjust screw of the present invention is characterized by including an adjust screw attached to a rocker arm for opening and closing a valve, including the multiplicity of minute recesses provided at random at least in a contact surface coming into contact with another member, in which a recess area ratio of the surface provided with the recesses ranges from 5 to 20%, and in which the surface provided with the recesses has a surface roughness parameter Rymax ranging from 0.4 to 1.0 µm. The term "another member" herein also refers to the valve or the pivot receiving member.

Further, the pivot receiving member of the present invention is characterized by including a pivot receiving member receiving an adjust screw attached to a rocker arm for opening and closing a valve, including the multiplicity of minute recesses provided at random at least in a contact surface coming into contact with the adjust screw, in which a recess area ratio of the surface provided with the recesses ranges from 5 to 20%, and in which the surface provided with the recesses has a surface roughness parameter Rymax ranging from 0.4 to 1.0 µm.

Further, the rocker arm of an arm type valve operating device of the present invention is characterized by including a rocker arm of an arm type valve operating device receiving a forward end portion of a valve by a valve receiving portion, in which the multiplicity of minute recesses provided at random at least in a receiving surface of the valve receiving portion, in which a recess area ratio of the surface provided with the recesses ranges from 5 to 20%, and in which the surface provided with the recesses has a surface roughness parameter Rymax ranging from 0.4 to 1.0 µm.

Further, the valve of an arm type valve operating device of the present invention is characterized by including a valve of an arm type valve operating device whose forward end portion comes into contact with a rocker arm, including the multiplicity of minute recesses provided at random at least in an arm contact surface of the forward end portion, in which a recess area ratio of the surface provided with the recesses ranges from 5 to 20%, and in which the surface provided with the recesses has a surface roughness parameter Rymax ranging from 0.4 to 1.0 µm.

As described above, in the present invention, the recess area ratio of the surface with recesses of the contact portion is set within the range of 5 to 20%, and the surface roughness parameter Rymax of the surface with recesses is set within the range of 0.4 to 1.0 µm, whereby it is possible to achieve an improvement in terms of oil-film-forming capacity, so a long service life can be attained even under a condition of thin lubrication and an extremely thin oil film.

EFFECTS OF THE INVENTION

As described above, according to the present invention, by providing at random a multiplicity of minute recesses, the contact surfaces (contact portions) exhibit finely-rough surfaces, facilitating the formation of an oil film. Further, those recesses constitute oil sumps, so oil film formation on the sliding surface can be reliably effected. Thus, it is possible to suppress a temperature rise, and to mitigate the metallic contact at the contact surfaces, or the pressure exerted between the contact portions in contact with each other, thereby enabling to suppress wear and pitching and to attain a long service life even under a condition of low viscosity, thin lubrication, and an extremely thin oil film.

DETAILED DESCRIPTION OF THE INVENTION

In the following, an embodiment of the present invention is described with reference to the drawings.

FIG. 1 shows a valve operating mechanism for an internal combustion engine which opens and closes a valve by a rocker arm. The valve operating mechanism of a first embodiment includes a rocker arm 51 and a cam 53, etc. arranged above a roller 52 disposed adjacent to the rocker arm 51, and opens and closes a valve 54 through rocking of the rocker arm 51. This valve operating mechanism is of the end pivot type.

At the center of the rocker arm 51, there is supported a shaft portion 52a of the roller 52. An adjust screw 55 is disposed adjacent to one end portion (on the side opposite to the valve) of the rocker arm 51. An adjust screw 55 is received by a support member (pivot receiving member) 56. That is, the adjust screw 55 has a semi-spherical convex portion 57, which is fit-engaged with a concave surface 58 of the pivot receiving member 56. A shaft portion 59 of the adjust screw 55 is threadedly engaged with one end portion (on the side opposite to the valve) of the rocker arm 51, and a nut 50 is threadedly engaged with a protrusion protruding from the upper end of one end portion of the rocker arm 51 and set in position. At the other end portion (on the valve side) of the rocker arm 51, there is provided a slit 60, which is connected by a connection member 61.

The valve 54 is equipped with a valve stem portion 62, and a resilient member 63 fitted onto the valve stem portion 62. A spacer 65 is fitted onto a small diameter portion 64 of the valve stem portion 62, and a support member 66 is fitted onto the spacer 65. An upper end 63a of the resilient member 63 is supported by the support member 66. A lower end 63b of the resilient member 63 is supported by a fixing portion 67.

The forward end portion (upper end portion) of the valve stem portion 62 abuts the connection member 61. That is, an upper end surface 71 of the valve stem portion 62 and a lower surface 73 of the connection member 61 are in contact with each other. The lower surface 73 of the connection member 61 is formed as a convex surface.

In this valve operating mechanism, constructed as described above, the cam 53 rotates to thereby push down the rocker arm 51, and, through this pushing down, the valve stem portion 62 abutting the connection member 61 is pushed down, placing the valve 54 in the open state. When the cam 53 further rotates to thereby cancel the force with which the rocker arm 51 is pushed down by the cam 53, the valve stem portion 62 ascends due to the resilient force of the resilient member 63, placing the valve 54 in the closed state.

In this case, the convex portion 57 of the adjust screw 55 and the concave surface 58 of the pivot receiving member 56 are in sliding contact with each other.

Further, as described above, the upper end surface 71 of the valve stem portion 62 and the lower surface 73 of the connection member 61 are held in contact with each other. Thus, the upper end surface 71 of the valve stem portion 62 constitutes an arm contact surface held in contact with the rocker arm 51 side, and the lower surface 73 of the connection member 61 as the valve receiving portion of the rocker arm 51 constitutes a receiving surface brought into contact with the valve 54 side.

In view of this, in the present invention, a multiplicity of minute recesses are provided at random at least in one of the concave surface (contact surface) 58 of the pivot receiving member 56 and the convex portion (contact surface) 57 of the adjust screw 55. The surface roughness parameter Ryni of the surface provided with the recesses is set within the range of 0.4 μm≦Ryni≦1.0 μm, with the Sk value being set to −1.6 or less.

Further, in the present invention, a multiplicity of minute recesses are provided at random in the arm contact surface of the valve 54 and in the receiving surface of the rocker arm 51. The surface roughness parameter Ryni of the surface provided with the recesses is set within the range of 0.4 μm≦Ryni≦1.0 μm, with the Sk value being set to −1.6 or less.

Further, the average area of the recesses ranges from 30 to 100 μm$^2$, and Rymax ranges from 0.4 to 1.0 μm.

Further, the area ratio of the recesses of the surface provided with the recesses ranges from 5 to 20%, and the surface roughness parameter Rymax of the surface provided with the recesses ranges from 0.4 to 1.0 μm.

When a special barrel polishing is performed as the surface treatment processing for obtaining the finely rough surface as described above, it is possible to obtain a desired finish surface through a special barrel polishing. However, this should not be construed restrictively. It is also possible to use, for example, a shot.

As described above, in the present invention, the surface roughness parameter Ryni of the surface provided with the recesses (contact portion) is set within the range of 0.4 μm≦Ryni≦1.0 μm, whereby it is possible to prevent depletion of oil film even under a condition of thin lubrication, thereby enabling to attain a long service life even when the oil film thickness is extremely small. Further, by setting the Sk value of the contact portion to −1.6 or less in both the width direction and the circumferential direction, the minute recesses constitute oil sumps, and, even when compressed, little oil leakage is involved in the slipping direction and the right-angle direction, thereby attaining superior oil film formation property and minimizing surface damage.

Further, by setting the average area of the recesses of the contact portion within the range of 30 to 100 μm$^2$, and setting the surface roughness parameter Rymax of the surface provided with the recesses within the range of 0.4 to 1.0 μm, it is possible to achieve an improvement in terms of oil-film-forming capacity, so a long service life can be attained even under a condition of thin lubrication and an extremely thin oil film.

Further, by setting the area ratio of the recesses of the surface provided with the recesses of the contact portion within the range of 5 to 20%, and setting the surface roughness parameter Rymax of the surface provided with the recesses within the range of 0.4 to 1.0 μm, it is possible to achieve an improvement in terms of oil-film-forming capacity, so a long service life can be attained even under a condition of thin lubrication and an extremely thin oil film.

Thus, the adjust screw, the pivot receiving member, the rocker arm, and the valve of the present invention help to attain a long service life even under a condition of low viscosity and thin lubrication, with the oil film being extremely thin.

If surface treatment satisfying the surface properties of the present invention is effected on at least one of the concave surface (contact surface) 58 of the pivot receiving member 56 and the convex surface (contact surface) 57 of the adjust screw 55, it is possible to sufficiently obtain an effect such as a long service life. However, it is still more effective to effect surface treatment satisfying the surface properties of the present invention on both contact surfaces. It is also possible to effect surface treatment satisfying the surface properties of the present invention on the entire adjust screw 55 or the entire pivot receiving member 56.

Similarly, if surface treatment satisfying the surface properties of the present invention is effected on one of the arm contact surface of the valve 54 and the receiving surface of the rocker arm 51, it is possible to sufficiently obtain an effect such as a long service life. However, it is still more effective to effect surface treatment satisfying the surface properties of the present invention on both the arm contact surface of the valve 54 and the receiving surface of the rocker arm 51.

Next, a second embodiment of the present invention is described with reference to FIG. 2. Like that of the first embodiment, this valve operating mechanism is of the end pivot type. A valve cap 68 is attached to the forward end portion (upper end portion) of the valve stem portion 62, and the valve cap 68 is in contact with the connection member 61. That is, the valve cap 68 includes a short cylindrical body with an upper wall 68a, and is fitted onto the forward end portion (upper end portion) of the valve stem portion 62. Thus, an inner surface 70 of the upper wall 68a of the valve cap 68 comes into contact with the upper end surface 71 of the valve stem portion 62. Further, an outer surface 72 of the upper wall 68a comes into contact with the lower surface 73 of the connection member 61. Otherwise, this embodiment is of the same construction as the valve operating mechanism as that shown in FIG. 1, so the same components are indicated by the same reference numeral as those of FIG. 1, and a redundant description thereof is omitted.

In the valve operating mechanism of the second embodiment, the cam 53 rotates to thereby push down the rocker arm 51, and, through this pushing-down, the valve stem portion 62 is pushed down via the valve cap 68 in contact with the connection member 61, placing the valve 54 in the open state. When the cam 53 further rotates to thereby cancel the force with which the rocker arm 51 is pushed down by the cam 53, the valve stem portion 62 ascends due to the resilient force of the resilient member 63, placing the valve 54 in the closed state.

In this case, as described above, the inner surface 70 of the upper wall 68a of the valve cap 68 and the upper end surface 71 of the valve stem portion 62 are brought into contact with each other, and the outer surface 72 of the upper wall 68a and the lower surface 73 of the connection member 61 are brought into contact with each other. Thus, of the valve cap 68, the inner surface 70 of the upper wall 68a constitutes the contact portion coming into contact with the valve side, and the outer surface 72 of the upper wall 68a constitutes the contact portion coming into contact with the rocker arm 51 side.

In view of this, in the present invention, a multiplicity of minute recesses are provided in at least one of the contact portion in contact with the valve 54 and the contact portion in contact with the rocker arm 51. The surface roughness parameter Ryni of the surface provided with the recesses is set within the range of $0.4\ \mu m \leqq Ryni \leqq 1.0\ \mu m$, with the Sk value being set to $-1.6$ or less.

Further, the average area of the recesses ranges from 30 to 100 $\mu m^2$, and Rymax ranges from 0.4 to 1.0 $\mu m$.

Further, the area ratio of the recesses of the surface provided with the recesses ranges from 5 to 20%, and the surface roughness parameter Rymax of the surface provided with the recesses ranges from 0.4 to 1.0 $\mu m$.

When a special barrel polishing is performed as the surface treatment processing for obtaining the finely rough surface as described above, it is possible to obtain a desired finish surface through a special barrel polishing. However, this should not be construed restrictively. It is also possible to use, for example, a shot.

As a result, like the adjust screw, the pivot receiving member, the rocker arm, and the valve of the first embodiment, the valve cap of the valve operating device of the second embodiment can attain a long service life even under a condition of low viscosity and thin lubrication, with the oil film being extremely thin.

While it is possible to sufficiently obtain an effect such as a long service life by effecting surface treatment satisfying the surface properties of the present invention on at least one of the contact portion in contact with the valve 54 and the contact portion in contact with the rocker arm 51, it is still more effective to effect such surface treatment satisfying the surface properties of the present invention on both contact portions.

Next, FIG. 3 shows a third embodiment. This valve operating mechanism is of the center pivot type. This valve operating mechanism includes a rocker arm 81, and a cam 83, etc. arranged under a roller 82 disposed adjacent to the rocker arm 81, with the valve 54 being opened and closed through rocking of the rocker arm 51. Since the valve 54 is the same as the valve shown in FIG. 1, it is indicated by the same reference numeral, and a redundant description thereof is omitted.

The rocker arm 81 has a reverse-V-shaped configuration in front view. A rocker shaft 86 is passed through the central portion of the rocker arm 81, and the roller 82 is disposed adjacent to one end portion thereof (end portion on the side opposite to the valve) 81a, with an adjust screw 85 being disposed adjacent to the other end portion thereof (the end portion on the valve side) 81b. The adjust screw 85 is threadedly engaged with a screw hole provided at the other end portion 81b of the rocker arm 81, and a nut 87 is threadedly engaged with and set in position on a protrusion protruding from the upper end of the other end portion 81b of the rocker arm 81.

In this valve operating mechanism, constructed as described above, the cam 83 rotates to thereby push up the one end portion 81a of the rocker arm 81, and, through this pushing up, the valve stem portion 62 abutting a lower surface 85a of the adjust screw 85 is pushed down, placing the valve 54 in the open state. When the cam 83 further rotates to thereby cancel the force with which the rocker arm 81 is pushed up by the cam 83, the valve stem portion 62 ascends due to the resilient force of the resilient member 63, placing the valve 54 in the closed state.

That is, the rocker arm 81 swings around the rocker shaft axis, and the inner peripheral surface of a shaft insertion hole 90 of the rocker arm 81 and the outer peripheral surface of the rocker shaft corresponding to this inner peripheral surface are held in sliding contact with each other.

In this case, a lower end surface 85a of the adjust screw 85 and the upper end surface 71 of the valve stem portion 62 are held in sliding contact with each other.

In view of this, in the present invention, a multiplicity of minute recesses are provided at random in the contact portion (contact surface) of one of the inner peripheral surface of the shaft insertion hole 90 of the rocker arm 81 and the outer peripheral surface of the rocker shaft 86 corresponding to this inner peripheral surface. The surface roughness parameter Ryni of the surface provided with the recesses is set within the range of $0.4\ \mu m \leqq Ryni \leqq 1.0\ \mu m$, with the Sk value being set to $-1.6$ or less.

Further, a multiplicity of minute recesses are provided at random in the lower end surface (contact surface) 85a of the adjust screw 85, and the surface roughness parameter Ryni of the surface provided with the recesses is set within the range of $0.4\ \mu m \leqq Ryni \leqq 1.0\ \mu m$, with the Sk value being set to $-1.6$ or less.

Further, the average area of the recesses ranges from 30 to 100 $\mu m^2$, and Rymax ranges from 0.4 to 1.0 $\mu m$.

Further, the area ratio of the recesses of the surface provided with the recesses ranges from 5 to 20%, and the surface roughness parameter Rymax of the surface provided with the recesses ranges from 0.4 to 1.0 $\mu m$.

As a result, like the adjust screw, the pivot receiving member, the rocker arm, and the valve of the first embodiment, the rocker arm 81 and rocker shaft 86 of the third embodiment can attain a long service life even under a condition of low viscosity and thin lubrication, with the oil film being extremely thin.

Further, like the concave surface (contact surface) 58 of the pivot receiving member 56, the convex portion (contact surface) 57 of the adjust screw 55, etc. of the first embodiment, the lower end surface (contact surface) 85a of the adjust screw 85 of the third embodiment can attain a long service life even under a condition of low viscosity and thin lubrication, with the oil film being extremely thin.

It is possible to sufficiently obtain an effect such as a long service life if surface treatment satisfying the surface properties of the present invention is effected on one of the inner peripheral surface of the shaft insertion hole 90 of the rocker arm 81 and the outer peripheral surface of the rocker shaft corresponding to this inner peripheral surface. However, it is still more effective to effect surface treatment satisfying the surface properties of the present invention on both surfaces (both contact portions).

EXAMPLE 1

In order to prove the usefulness of the present invention, service life evaluation was made on a rolling bearing and a gear. In a rolling bearing, an inner race (mating shaft) and an outer race (outer ring) are in rolling contact with each other, and the tooth surfaces of the gear are in sliding contact with the mating tooth surfaces. In the rolling bearing the contact is effected in a state similar to the contact between the rocker arm and the rocker shaft, the contact of the valve cap, the contact between the adjust screw and the pivot receiving member, and the contact between the valve receiving portion and the valve. Thus, it is to be assumed that service life evaluation on the rocker arm, the rocker shaft, the valve cap, the adjust screw, the valve receiving portion, and the valve can be made through service life evaluation on a rolling bearing and a gear. In the following, an example of the method of measuring the parameters Ryni, Rymax, Sk, and Rqni and an example of the condition is described. When measuring the surface properties expressed by those parameters, a measurement value obtained at a single site can be relied upon as a typical value. However, it is advisable to perform measurement on two sites opposed to each other in the diameter direction.

Parameter calculation standard: JIS B 0601:1994 (SURFCOM, JIS 1994)
Cut off type: Gaussian
Measurement length: 5λ
Cut off wavelength: 0.25 mm
Measurement magnification: ×10000
Measurement speed: 0.30 mm/s
Site of measurement: center region of the object
Number of measurements: 2
Measurement device: surface roughness measurement device SURFCOM 1400 A (TOKYO SEIMITSU CO., LTD.)

In performing quantitative measurement on the recesses, the surface of the object is magnified, and quantification is possible from an image obtained by an image analysis system commercially available. Further, by using the surface property inspection method and the surface property inspection device as disclosed in JP 2001-183124 A, it is possible to perform measurement accurately in a stable manner. According to this method, light is applied to an inspection surface with curvature, and the inspection surface is photographed by a camera. The luminance of the image of the inspection surface photographed by the camera is measured, and the surface properties of the inspection surface is inspected through a light/dark pattern formed through contrast of light and dark portions whose luminance has been measured. The light is applied in alignment with the optical axis direction of the camera, and positioning is effected on the inspection surface such that the position where the luminance distribution of the measured image indicates a peak value is matched with the optical axis of the camera, whereby the shading (luminance distribution) attributable to the curvature of the inspection surface is suppressed. Further, the light is applied in alignment with the optical axis direction of the camera, and the position on the inspection surface corresponding to the position where the luminance distribution of the measured image indicates a peak value is regarded as the origin. In this orthogonal two-dimensional coordinate system one axis of which is the curvature symmetry axis, the one-dimensional luminance distributions along the orthogonal coordinate axes are approximated by approximation functions. By using those approximation functions, the luminance of the measured image corresponding to each coordinate position is corrected so as to remove the luminance distribution of the image by using the peak value of the luminance distribution as a reference value, inspecting the surface properties of the inspection surface based on the light/dark pattern of the corrected luminance. As a result, it is possible to inspect the surface properties from the light/dark pattern with no shading. The measurement condition is, for example, as follows. As in the case of the above-mentioned parameters, in measuring the area ratio and the average area of the recesses, a measurement value obtained at a single site is reliable as a typical value. However, it is advisable to perform measurement on, for example, two sites.

Area ratio: proportion of pixels (black) smaller than binary threshold value ((light portion luminance+dark portion luminance)/2) in observation visual field range
Average area: total of black area/total number
Observation visual field: 826 μm×620 μm
Site of measurement: center region of the object
Number of measurements: 2

FIG. 4 shows an example of a test rolling bearing. A rolling bearing 10 is a needle roller bearing into which a needle roller 12 is incorporated into an outer ring 13 as a rolling element, with a mating shaft 14 being supported by the needle roller 12. A plurality of kinds of needle roller bearings differing in finish surface treatment were prepared, and service life test was conducted thereon. The test results are as follows. As shown in FIG. 5, the needle roller bearing used in the service life test was a bearing with a retainer 15 which has an outer diameter Dr of 33 mm and an inner diameter dr of 25 mm and which uses fifteen needle rollers 12 each having a diameter D1 of 4 mm and a length L of 25.8 mm. As the test bearings, three kinds of bearings differing in needle roller surface roughness finish were prepared: a bearing A (comparative example) which underwent super finish after grinding; a bearing B (comparative example) with a multiplicity of minute recesses formed at random; a bearing C (reference example); and a bearing D (reference example). FIGS. 6 to 8 show the finish surface conditions of the needle rollers of the test bearings. More specifically, FIG. 6 shows the surface roughness of the bearing A, FIG. 7 shows the surface roughness of the bearing B, and FIG. 8 shows the surface roughness of the bearing C and the bearing D. Table 1 shows the characteristic value parameters of the finish surfaces of the test bearings. Regarding the ratio of the axial roughness Rqni (L) to the circumferential surface roughness (C), that is, Rqni (L/C), it is 1.0 or less in the bearings B, C, and D, and around 1.5 in the bearing A. Crystal grain size measurement was conducted based on the austenite grain size testing method for the steel of JIS G 0551.

TABLE 1

| Bearing | Rqni (μm) | SK | Ryni (μm) | Rymax (μm) | Area ratio (%) | Average area (μm$^2$) | Rqni (L/C) | Crystal grain size |
|---|---|---|---|---|---|---|---|---|
| A (Comparative Example) | 0.01~0.03 | −0.8~0.9 | 0.1~0.2 | 0.1~0.3 | — | — | — | 9 |
| B (Comparative Example) | 0.10~0.20 | −5.0~−2.0 | 1.1~1.5 | 1.1~2.0 | 24~40 | 105~150 | ≦1.5 | 11 |

TABLE 1-continued

| Bearing | Rqni (μm) | SK | Ryni (μm) | Rymax (μm) | Area ratio (%) | Average area (μm$^2$) | Rqni (L/C) | Crystal grain size |
|---|---|---|---|---|---|---|---|---|
| C (Reference Example) | 0.05~0.09 | −4.9~−1.6 | 0.4~1.0 | 0.4~1.0 | 5~20 | 30~100 | ≦1.5 | 9 |
| D (Reference Example) | 0.05~0.09 | −4.9~−1.6 | 0.4~1.0 | 0.4~1.0 | 5~20 | 30~100 | ≦1.5 | 11 |

The testing apparatus used was a radial load testing machine 16 as schematically shown in FIG. 9. A test bearing 10 is mounted on both sides of a rotary shaft 17, and testing is conducted by imparting rotation and load thereto. The finishing of the inner race (mating shaft) used for the test is a polishing finish Ra of 0.10 to 0.16 μm. This also applies to the outer race (outer ring).

The test conditions are as follows:
Bearing radial load: 19613 N (2000 kgf)
RPM: 4000 min$^{-1}$
Lubricant: Crysek oil H8(2 cst under the testing condition)

FIG. 10 shows service life test results under a condition of an oil film parameter Λ=0.13. In the drawing, the vertical axis indicates the service life (h). As shown in the drawing, the bearing A exhibited a service life of 78 h, and the bearing B exhibited a service life of 82 h, whereas the bearings C and D exhibited service lives of 105 h and 121 h, respectively. As is apparent from this data, the bearings C and D, in which the needle roller surfaces have undergone surface treatment to satisfy the surface properties of the present invention, can provide a long service life even under a very hostile condition of low viscosity and thin lubrication, with the oil film parameter Λ being 0.13. Thus, the rocker arm, the rocker shaft, the valve cap, the adjust screw, the valve receiving portion, and the valve of the present invention, in which the contact portions are set within the above value ranges, can provide a long service life.

EXAMPLE 2

Next, a gear pitching test was conducted by using a spur gear fatigue testing machine as shown in FIG. 11 to evaluate pitching strength. In FIG. 11, a drive side gear 31 (with 29 teeth) and a driven side gear 32 (with 30 teeth) are respectively mounted to one end of each of rotation shafts 33 and 34, and the drive side shaft 33 is driven by a motor (not shown). Further, torque is imparted by a load lever 35 and a weight 36 mounted to the drive side shaft 33. There were prepared two kinds of drive side gear 31: one that had undergone surface treatment according to the present invention; and one that had not. Details such as test conditions are shown in Table 2.

TABLE 2

| Testing machine | Spur gear fatigue testing machine |
|---|---|
| Drive side gear | Outer diameter φ79, Inner diameter φ35, Tooth width 8.2 |
| | Scr420 (Carburizing treatment) |
| | Number of teeth: 29 |
| Driven side gear | Outer diameter φ79, Inner diameter φ35, Tooth width 15 |
| | Scr420 (Carburizing treatment) |
| | Number of teeth: 30 |
| RPM | 3500 min$^{-1}$ |
| Torque | 186 N · m(19 kgf · m) |
| Lubricant oil temperature | 80° C. |
| Lubricant oil | ATF oil |

Tables 3, 4, and 5 show the data obtained from the gear pitching test. Table 3 shows the results (comparative example) obtained in the case (a) in which surface treatment was conducted on neither the drive side nor the driven side gear, Table 4 shows the results (example) obtained in the case (b) in which surface treatment to satisfy the surface properties of the present invention was effected on the tooth surface of the drive side gear, and Table 5 shows the results (example) obtained in the case (c) in which surface treatment to satisfy the surface properties of the present invention was effected on the tooth surfaces of both the drive side gear and the driven side gear. Those results confirms that, as compared with the case (a), the pitching service life is increased by two times or more in the case of (b), and by three times or more in the case of (c).

TABLE 3

(a)

| Surface treatment on test gear (comparative example) | | Number of times load |
|---|---|---|
| Drive side | Driven side | is applied |
| 1st time | With no surface treatment | With no surface treatment | 6.0 × 10$^6$ |
| 2nd time | With no surface treatment | With no surface treatment | 5.0 × 10$^6$ |

TABLE 4

(b)

| Surface treatment on test gear (example) | | Number of times load |
|---|---|---|
| Drive side | Driven side | is applied |
| 1st time | With surface treatment | With no surface treatment | 1.25 × 10$^7$ |
| 2nd time | With surface treatment | With no surface treatment | 1.50 × 10$^7$ |

TABLE 5

(c)

| Surface treatment on test gear (example) | | Number of times load |
|---|---|---|
| Drive side | Driven side | is applied |
| 1st time | With surface treatment | With surface treatment | 2.0 × 10$^7$ |
| 2nd time | With surface treatment | With surface treatment | 2.0 × 10$^7$ |

DESCRIPTION OF REFERENCE NUMERALS

Figure 1:
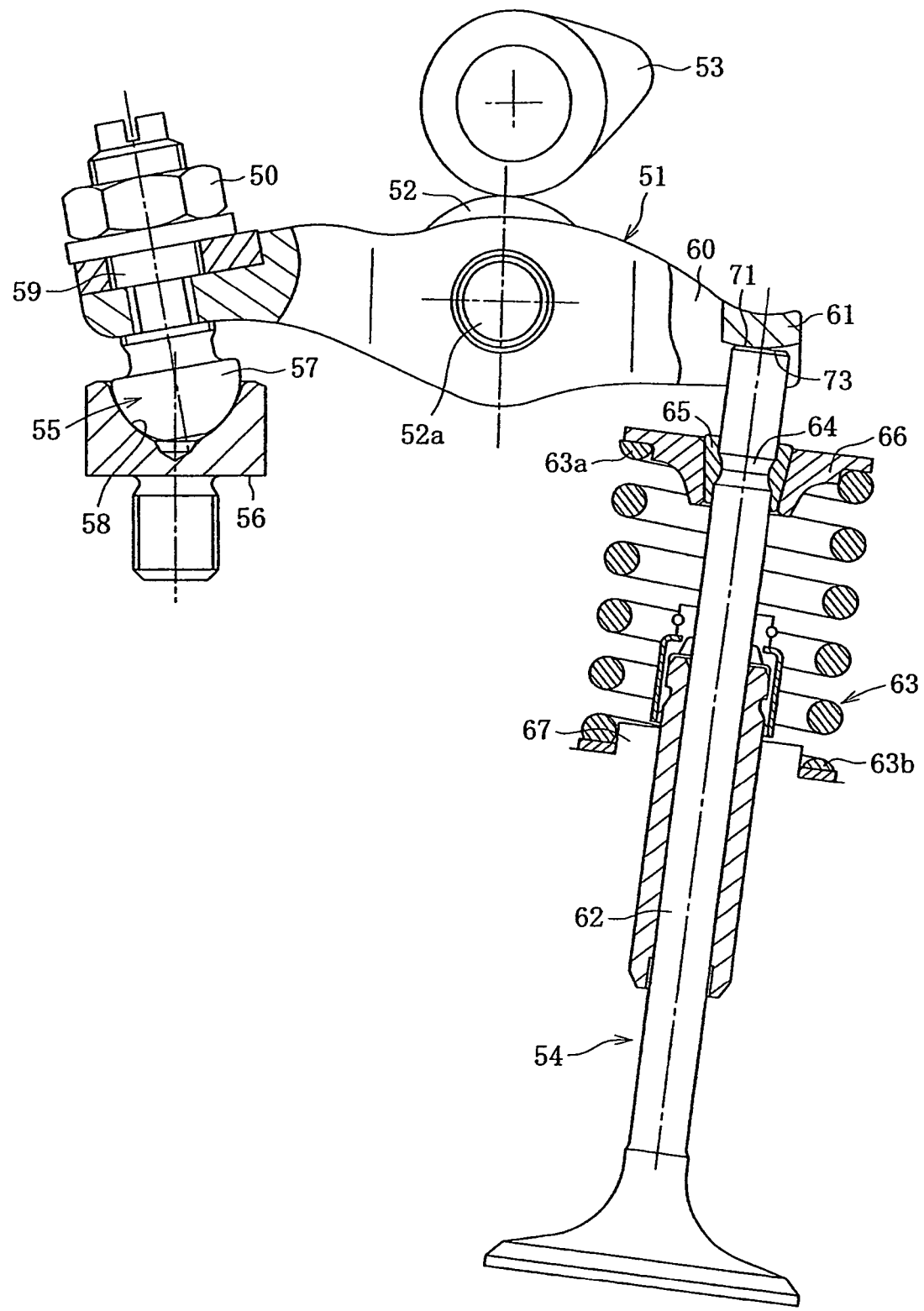
FIG. 1 A schematic view of a valve operating mechanism for an internal combustion engine according to a first embodiment of the present invention.
Figure 2:
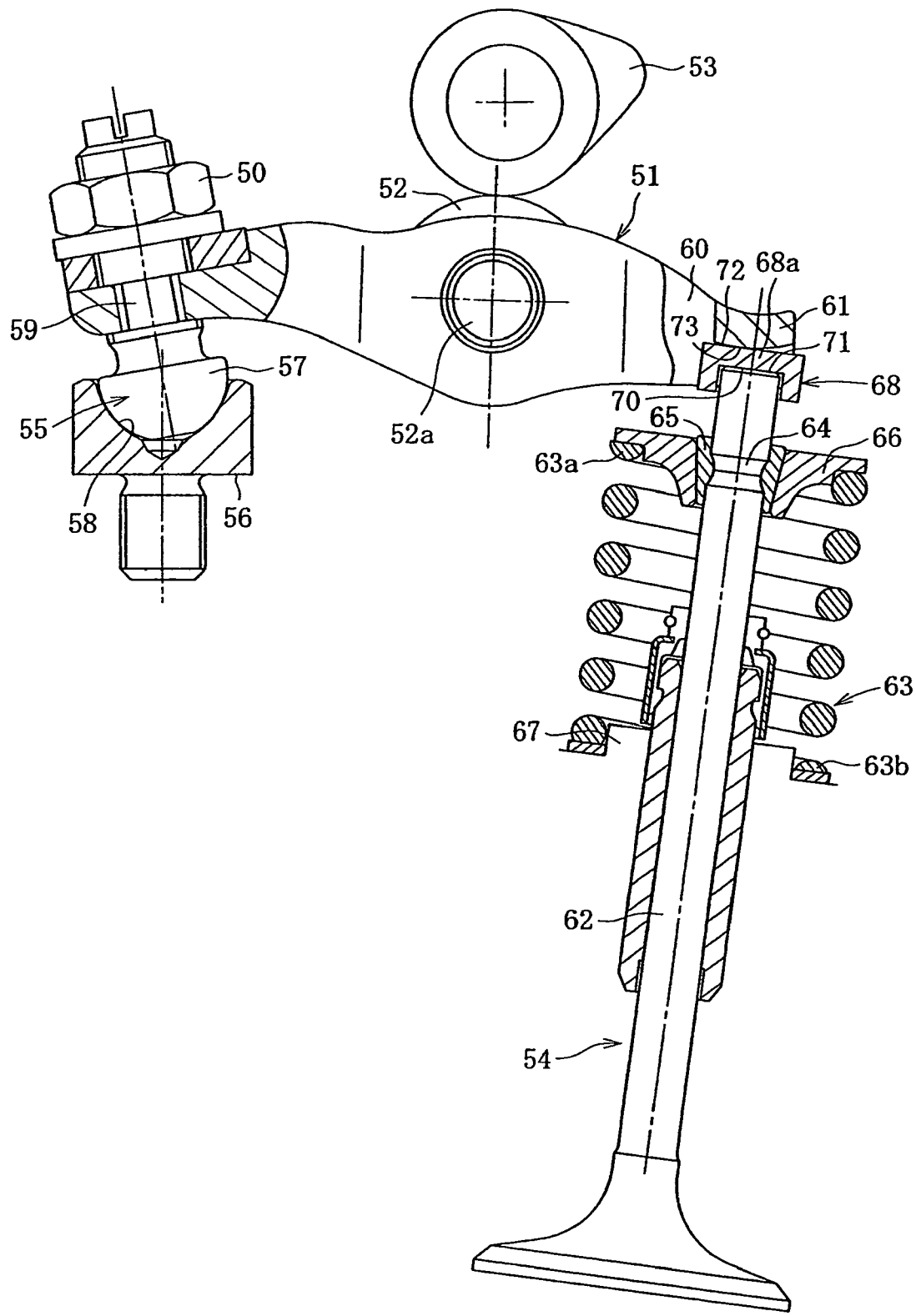
FIG. 2 A schematic view of a valve operating mechanism for an internal combustion engine according to a second embodiment of the present invention.
Figure 3:
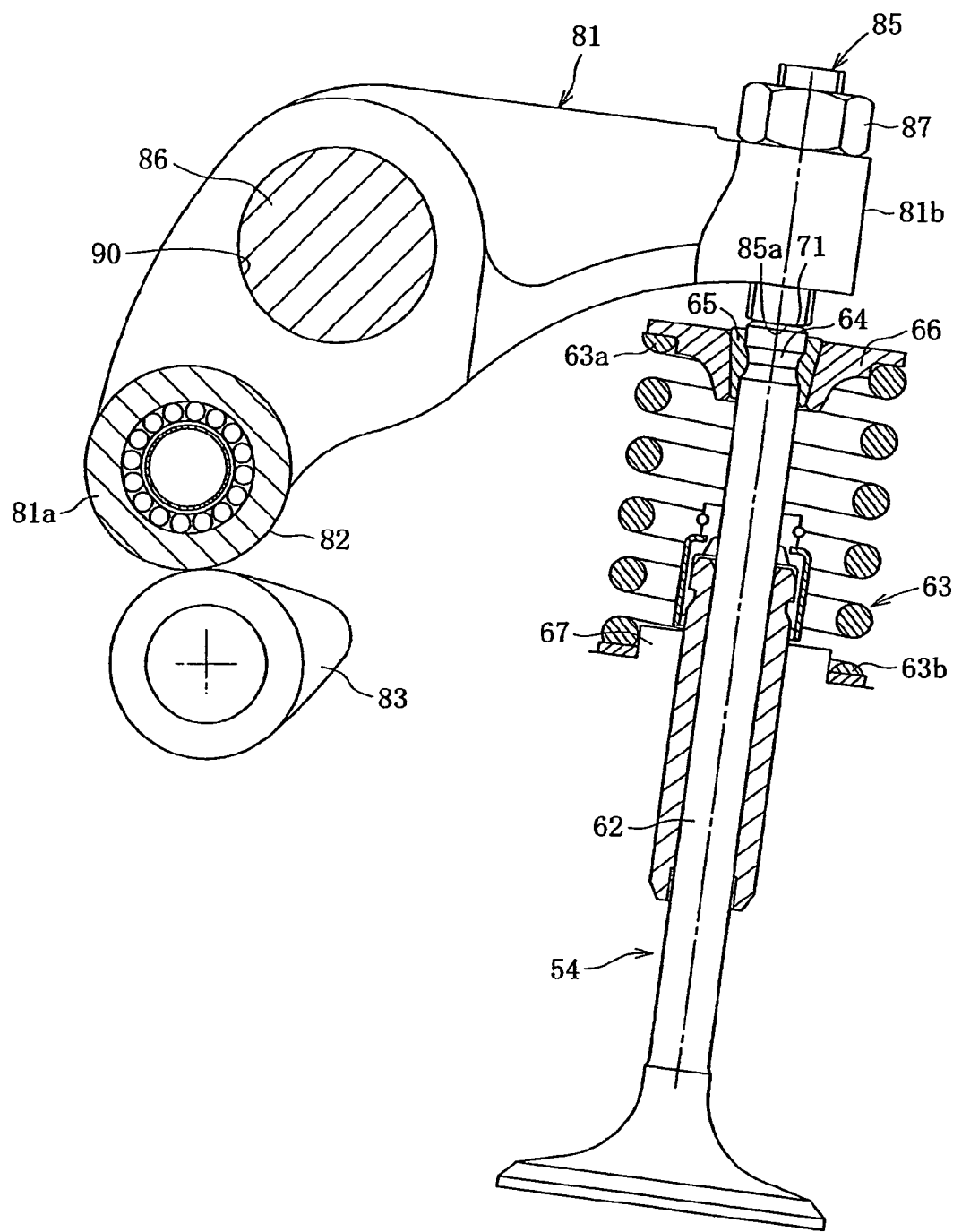
FIG. 3 A schematic view of a valve operating mechanism for an internal combustion engine according to a third embodiment of the present invention.
Figure 4:
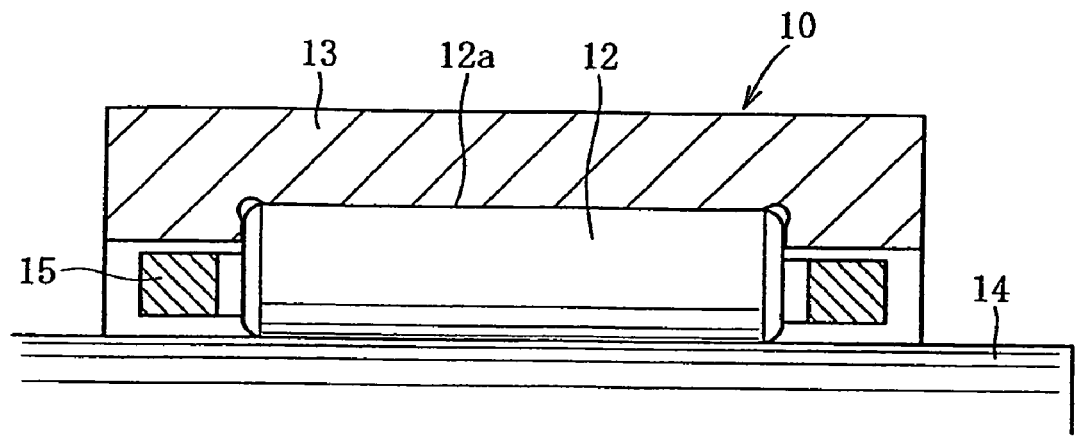
FIG. 4 A sectional view of a needle roller bearing.
Figure 5:
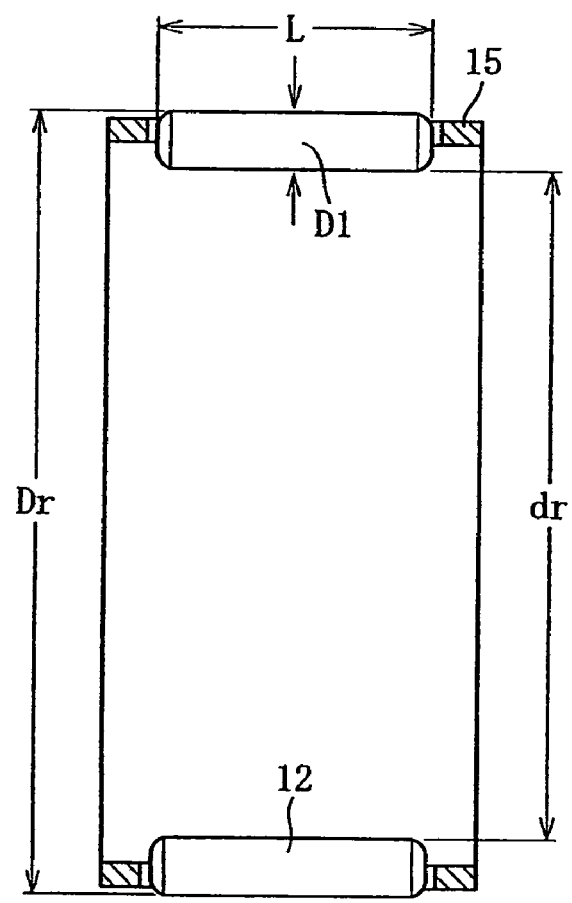
FIG. 5 A sectional view of a needle roller bearing used in a service life test.
Figure 6:
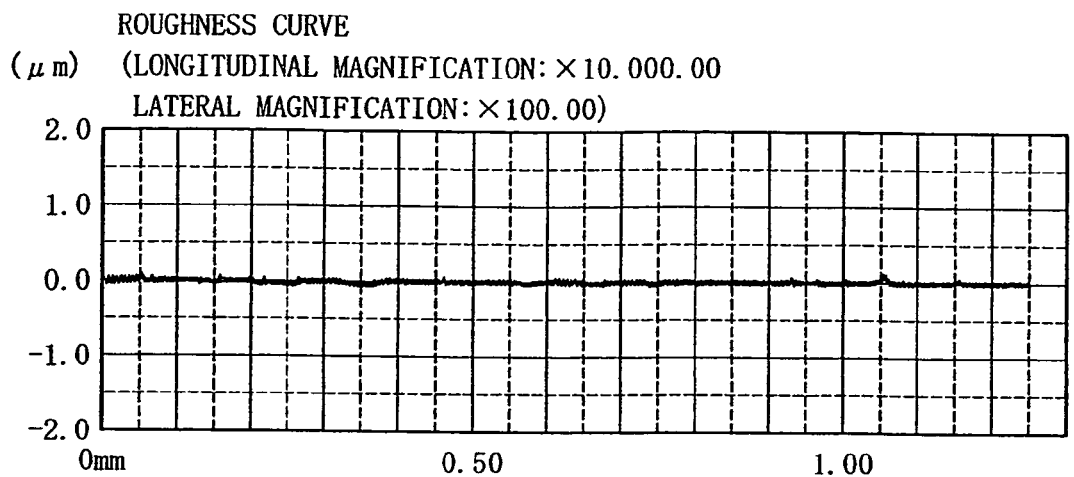
FIG. 6 A surface roughness curve chart showing the finish surface condition of a test bearing A.
Figure 7:
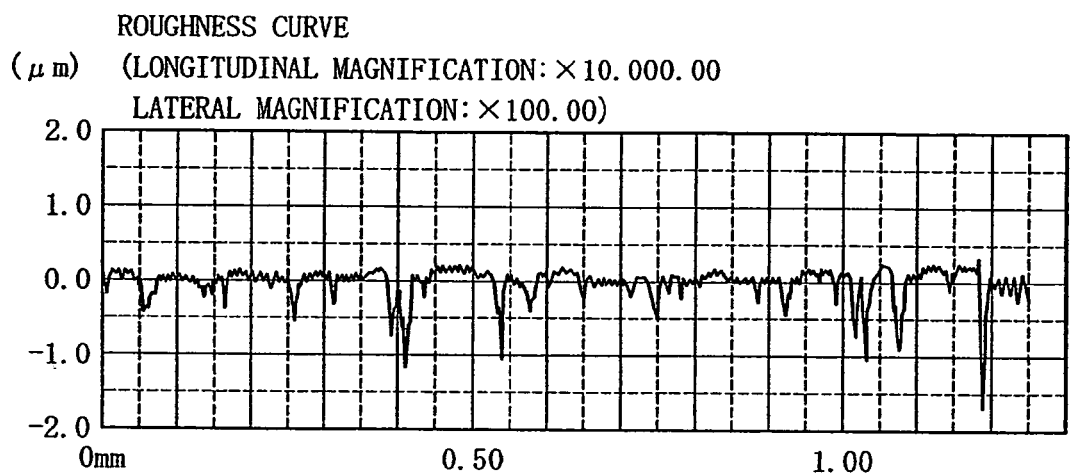
FIG. 7 A surface roughness curve chart showing the finish surface condition of a test bearing B.
Figure 8:
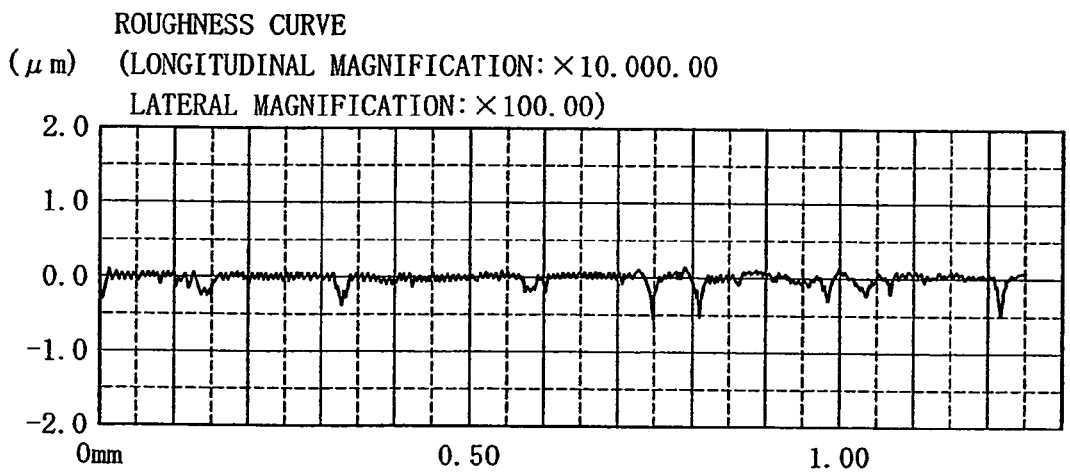
FIG. 8 A surface roughness curve chart showing the finish surface condition of test bearings C and D.
Figure 9:
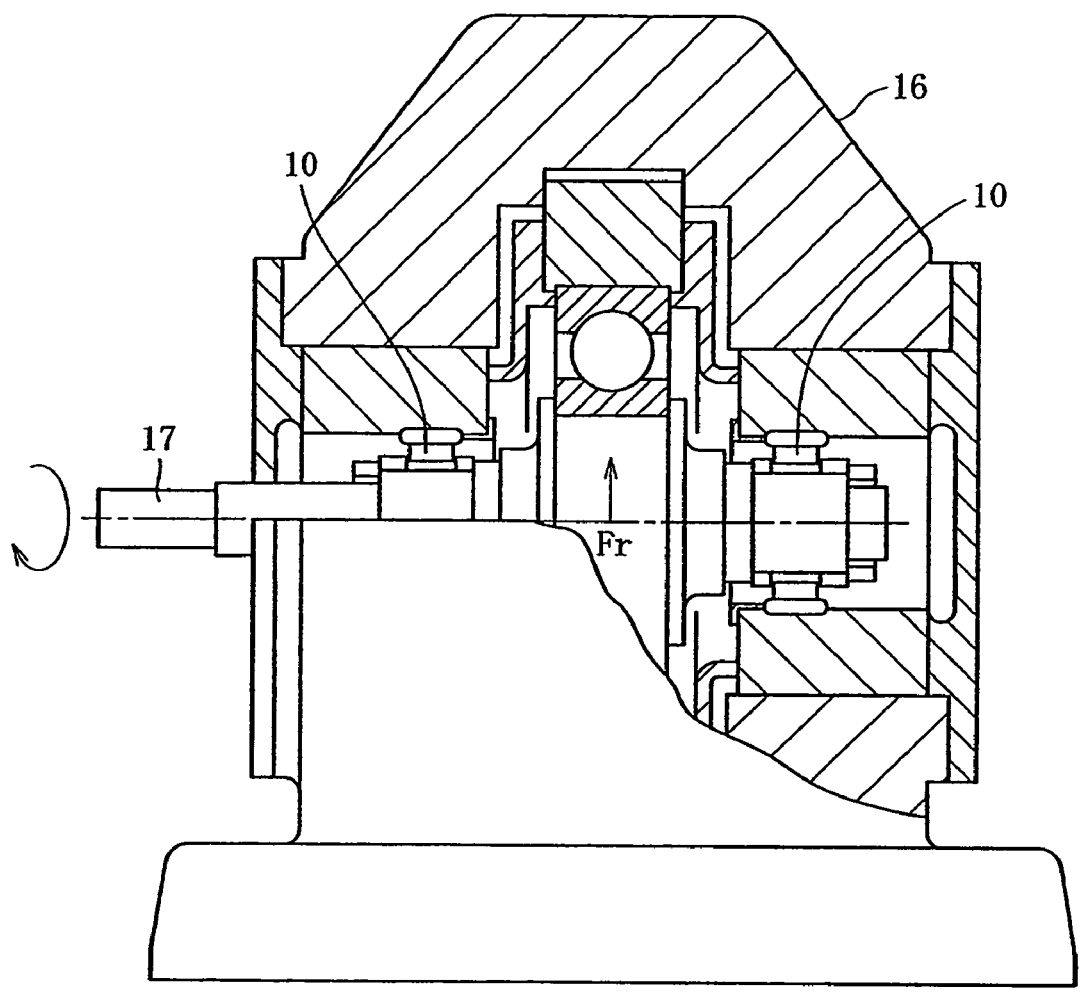
FIG. 9 A partial sectional view of a testing machine.
Figure 10:
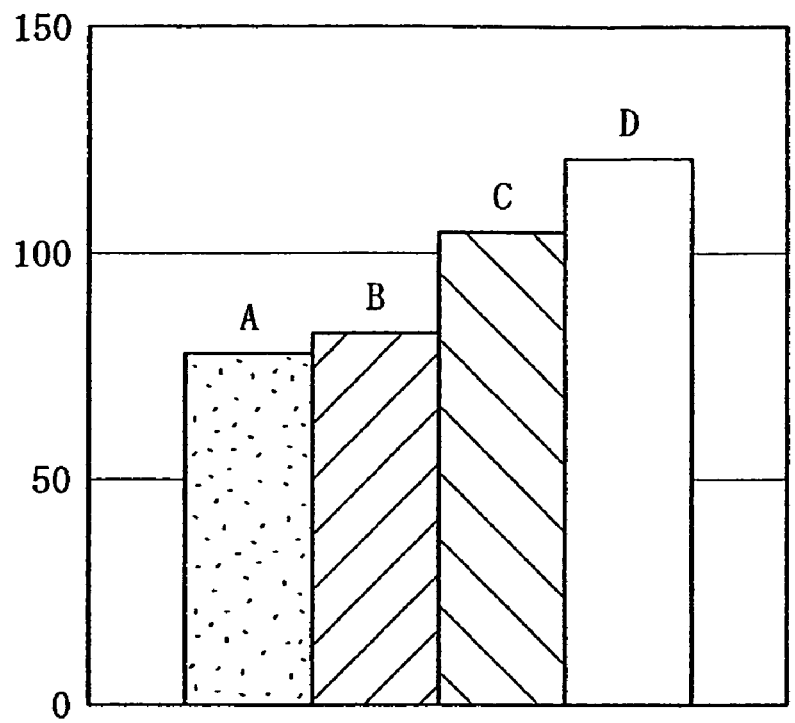
FIG. 10 A graph showing the results of a service life test.
Figure 11:
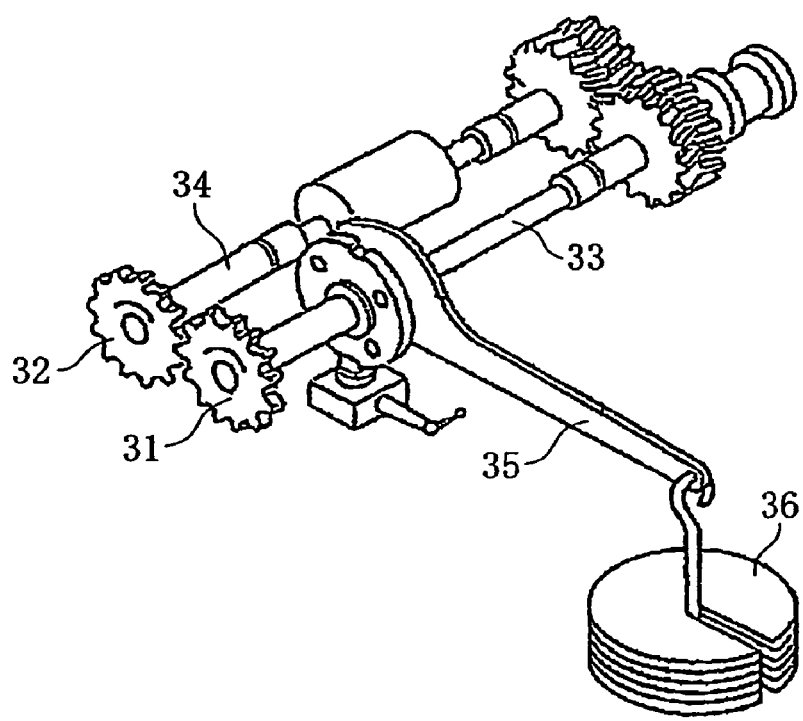
FIG. 11 A partial perspective view of a spur gear testing machine.

| | |
|---|---|
| 51 | rocker arm |
| 54 | valve |
| 55 | adjust screw |
| 56 | pivot receiving member |
| 61 | connection member (valve receiving portion) |
| 62 | valve stem portion |
| 68 | valve cap |
| 81 | rocker arm |
| 85 | adjust screw |
| 86 | rocker shaft |

The invention claimed is:

1. A rocker arm for opening and closing a valve, comprising:
a multiplicity of minute recesses provided at random at least in a contact portion, the contact portion being arranged to be in sliding, reciprocating contact with a rocker shaft, wherein
a surface of the contact portion having the recesses has a surface roughness parameter Ryni that is in a range: $0.4\ \mu m \leqq Ryni \leqq 1.0\ \mu m$, a parameter Rqni that is in a range from $0.05\ \mu m$ to $0.09\ \mu m$, and an Sk value of $-1.6$ or less.

2. A rocker arm according to claim 1,
wherein an average area of the recesses of the surface provided with the recesses ranges from 30 to 100 $\mu m^2$, and
wherein the surface provided with the recesses has a surface roughness parameter Rymax ranging from 0.4 to 1.0 $\mu m$.

3. A rocker arm according to claim 2,
wherein a recess area ratio of the surface provided with the recesses ranges from 5 to 20%.

4. A rocker shaft which supports a rocker arm for opening and closing a valve, comprising:
a multiplicity of minute recesses provided at random at least in a contact portion, the contact portion being arranged to be in sliding, reciprocating contact with the rocker arm, wherein
a surface of the contact portion having the recesses has a surface roughness parameter Ryni that is in a range: $0.4\ \mu m \leqq Ryni \leqq 1.0\ \mu m$, a parameter Rqni that is in a range from $0.05\ \mu m$ to $0.09\ \mu m$, and an Sk value of $-1.6$ or less.

5. A rocker shaft according to claim 4,
wherein an average area of the recesses of the surface provided with the recesses ranges from 30 to 100 $\mu m^2$, and
wherein the surface provided with the recesses has a surface roughness parameter Rymax ranging from 0.4 to 1.0 $\mu m$.

6. A rocker shaft according to claim 5,
wherein a recess area ratio of the surface provided with the recesses ranges from 5 to 20%.

7. A valve cap arranged at a forward end of a valve and abutting a rocker arm, comprising:
a multiplicity of minute recesses provided at random in at least one of a first contact portion and a second contact portion, the first contact portion being arranged to be in sliding, reciprocating contact with the valve, and the second contact portion being arranged to be in sliding, reciprocating contact with the rocker arm, wherein
a surface of the at least one of the first and second contact portions having the recesses has a surface roughness parameter Ryni that is in a range: $0.4\ \mu m \leqq Ryni \leqq 1.0\ \mu m$, a parameter Rqni that is in a range from $0.05\ \mu m$ to $0.09\ \mu m$, and an Sk value of $-1.6$ or less.

8. A valve cap according to claim 7,
wherein an average area of the recesses ranges from 30 to 100 $\mu m^2$, and
wherein the surface of the at least one of the first and second contact portions having the recesses has a surface roughness parameter Rymax ranging from 0.4 to 1.0 $\mu m$.

9. A valve cap according to claim 8,
wherein a recess area ratio of the surface of the at least one of the first and second contact portions provided with the recesses ranges from 5 to 20%.

10. An adjust screw attached to a rocker arm for opening and closing a valve, comprising:
a multiplicity of minute recesses provided at random at least in a contact surface, the contact surface being arranged to be in sliding, reciprocating contact with another member,
wherein the contact surface having the recesses has a surface roughness parameter Ryni that is in a range: $0.4\ \mu m \leqq Ryni \leqq 1.0\ \mu m$, a parameter Rqni that is in a range from $0.05\ \mu m$ to $0.09\ \mu m$, and an Sk value of $-1.6$ or less.

11. An adjust screw according to claim 10,
wherein an average area of the recesses of the contact surface provided with the recesses ranges from 30 to 100 $\mu m^2$, and
wherein the contact surface provided with the recesses has a surface roughness parameter Rymax ranging from 0.4 to 1.0 $\mu m$.

12. An adjust screw according to claim 11,
wherein a recess area ratio of the contact surface provided with the recesses ranges from 5 to 20%.

13. A pivot receiving member receiving an adjust screw attached to a rocker arm for opening and closing a valve, comprising:
a multiplicity of minute recesses provided at random in a contact surface of the pivot receiving member, the contact surface being arranged to be in sliding, reciprocating contact with the adjust screw,
wherein the contact surface having the recesses has a surface roughness parameter Ryni that is in a range: 0.4

$\mu m \leqq Ryni \leqq 1.0\ \mu m$, a parameter Rqni that is in a range from $0.05\ \mu m$ to $0.09\ \mu m$, and an Sk value of $-1.6$ or less.

14. A pivot receiving member according to claim 13,
wherein an average area of the recesses of the contact surface provided with the recesses ranges from 30 to 100 $\mu m^2$, and
wherein the contact surface provided with the recesses has a surface roughness parameter Rymax ranging from 0.4 to $1.0\ \mu m$.

15. A pivot receiving member according to claim 14,
wherein a recess area ratio of the contact surface provided with the recesses ranges from 5 to 20%.

16. A rocker arm of an arm type valve operating device, comprising:
a valve receiving portion for receiving a forward end portion of a valve; and
a multiplicity of minute recesses provided at random at least in a receiving surface of the valve receiving portion, the receiving surface being arranged to be in sliding, reciprocating contact with the forward end portion of the valve,
wherein the receiving surface having the recesses has a surface roughness parameter Ryni that is in a range: $0.4\ \mu m \leqq Ryni \leqq 1.0\ \mu m$, a parameter Rqni that is in a range from $0.05\ \mu m$ to $0.09\ \mu m$, and an Sk value of $-1.6$ or less.

17. A rocker arm according to claim 16,
wherein an average area of the recesses ranges from 30 to 100 $\mu m^2$, and
wherein the receiving surface having the recesses has a surface roughness parameter Rymax ranging from 0.4 to $1.0\ \mu m$.

18. A rocker arm according to claim 17,
wherein a recess area ratio of the receiving surface provided with the recesses ranges from 5 to 20%.

19. A valve of an arm type valve operating device, comprising:
a forward end portion having an arm contact surface arranged to be in sliding, reciprocating contact with a rocker arm; and
a multiplicity of minute recesses provided at random at least in the arm contact surface of the forward end portion,
wherein the arm contact surface provided with the recesses has a surface roughness parameter Ryni that is in a range: $0.4\ \mu m \leqq Ryni \leqq 1.0\ \mu m$, a parameter Rqni that is in a range from $0.05\ \mu m$ to $0.09\ \mu m$, and an Sk value of $-1.6$ or less.

20. A valve according to claim 19,
wherein an average area of the recesses ranges from 30 to 100 $\mu m^2$, and
wherein the arm contact surface having the recesses has a surface roughness parameter Rymax ranging from 0.4 to $1.0\ \mu m$.

21. A valve according to claim 20,
wherein a recess area ratio of the arm contact surface provided with the recesses ranges from 5 to 20%.

* * * * *